(12) United States Patent
Ross (10) Patent No.: US 8,285,617 B1
(45) Date of Patent: Oct. 9, 2012

(54) PUB/SUB ENGINE FOR AUTOMATED PROCESSING OF FIX MESSAGES

(76) Inventor: Richard A Ross, Weston, CT (US)

( * ) Notice: Subject to any disclaimer, the term of this patent is extended or adjusted under 35 U.S.C. 154(b) by 188 days.

(21) Appl. No.: 12/797,449

(22) Filed: Jun. 9, 2010

Related U.S. Application Data (60) Provisional application No. 61/187,037, filed on Jun. 15, 2009.

(51) Int. Cl.
*G06F 17/00* (2006.01)
(52) U.S. Cl. ............................ 705/35; 707/628; 707/632
(58) Field of Classification Search .................. 707/628, 707/632
See application file for complete search history.

(56) References Cited

U.S. PATENT DOCUMENTS

| | | | | |
|---|---|---|---|---|
| 2003/0014462 | A1* | 1/2003 | Bennett et al. | 709/100 |
| 2003/0120785 | A1* | 6/2003 | Young | 709/228 |
| 2004/0015905 | A1* | 1/2004 | Huima | 717/141 |
| 2008/0243675 | A1* | 10/2008 | Parsons et al. | 705/37 |
| 2009/0254601 | A1* | 10/2009 | Moeller et al. | 709/201 |
| 2009/0293125 | A1* | 11/2009 | Szor | 726/24 |
| 2010/0153434 | A1* | 6/2010 | Erickson et al. | 707/769 |

* cited by examiner

*Primary Examiner* — William Rankins
(74) *Attorney, Agent, or Firm* — North Shore Patents, P.C.; Michele Liu Baillie

(57) ABSTRACT

A computer implemented method for automated content-based processing of FIX messages to facilitate the selective delivery of Financial Information eXchange (FIX) messages, includes: receiving a FIX message; for each of a plurality of subscription filters received from a client computer, calculating a True/False (T/F) value indicating whether the FIX message satisfies the subscription filter, where each subscription filter indicates FIX message content of interest; storing the T/F values for the plurality of subscription filters in a T/F array; and returning the T/F array to the client computer. The T/F array is an array of elements, where each element corresponds to a subscription filter. Once the client computer receives the T/F array, the client computer uses the array to determine to which subscribers the FIX message is to be sent. In this manner, the method facilitates the selective delivery of FIX messages by the client computer.

24 Claims, 5 Drawing Sheets

PUB/SUB ENGINE FOR AUTOMATED PROCESSING OF FIX MESSAGES

CROSS-REFERENCE TO RELATED APPLICATIONS

The present application claims priority to U.S. provisional application entitled, "Pub/Sub Engine for Automated Processing of FIX Messages", Ser. No. 61/187,037, filed on Jun. 15, 2009.

BACKGROUND OF THE INVENTION

The receipt of Financial Information eXchange (FIX) messages concerning equities and derivatives are of great interest to many in the financial industry and to investors. FIX messages follow the FIX protocol, which is a series of messaging specifications for the electronic communication of trade-related messages. Details concerning the FIX protocol can be found at the website: www.fixprotcol.org. Typically, a user is interested in only a fraction of the large number of FIX messages generated each day. Interest can be based on stock name, price, date, event, etc. Thus, a method for automating the content-based processing of FIX messages to facilitate selective delivery of FIX messages would be a very useful tool.

BRIEF SUMMARY OF THE INVENTION

A computer implemented method for automated content-based processing of FIX messages to facilitate the selective delivery of Financial Information eXchange (FIX) messages, comprises: (a) receiving a FIX message; (b) for each of a plurality of subscription filters received from a client computer, calculating a True/False (T/F) value indicating whether the FIX message satisfies the subscription filter, wherein each subscription filter indicates FIX message content of interest; (c) storing the T/F values for the plurality of subscription filters in a T/F array; and (d) returning the T/F array to the client.

In one embodiment, the T/F array is an array of elements, where each element corresponds to a subscription filter.

In one embodiment, the method is implemented by a publish/subscribe (pub/sub) engine. Prior to processing FIX messages, the pub/sub engine received the plurality of subscription filters from the client computer and registers the subscription filters. In registering the subscription filters, the pub/sub engine: parses the subscription filter to identify clauses and Boolean operations; parses each of the identified clauses to identify field, operations, and argument; and stores the parsed clauses and identified Boolean operations in a filter array.

In one embodiment, each of the subscription filters comprises a Boolean combination of clauses. In calculating the T/F value for the subscription of filters, the pub/sub engine: obtains values for fields of interest in the plurality of subscription filters; for each clause in each of the plurality of subscription filters, calculates a T/F value for the clause; and for each of the plurality of subscription filters, calculates a T/F value for the subscription filter using the T/F values calculated for each clause. The T/F value for the subscription filter is then stored in the corresponding element of the T/F array.

Once the client computer receives the T/F array, the client computer uses the array to determine to which subscribers the FIX message is to be sent. For example, for each True valued element in the array, the client computer broadcasts the FIX message to the subscriber who owns the subscription filter corresponding to the element. In this manner, the method facilitates the selective delivery of FIX messages by the client computer.

System and computer program products corresponding to the above-summarized methods are also described and claimed herein.

DETAILED DESCRIPTION OF THE INVENTION

The present invention provides a method for automated content-based processing of FIX messages to facilitate the selective delivery of FIX messages. The following description is presented to enable one of ordinary skill in the art to make and use the present invention and is provided in the context of a patent application and its requirements. Various modifications to the embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, point devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 1:
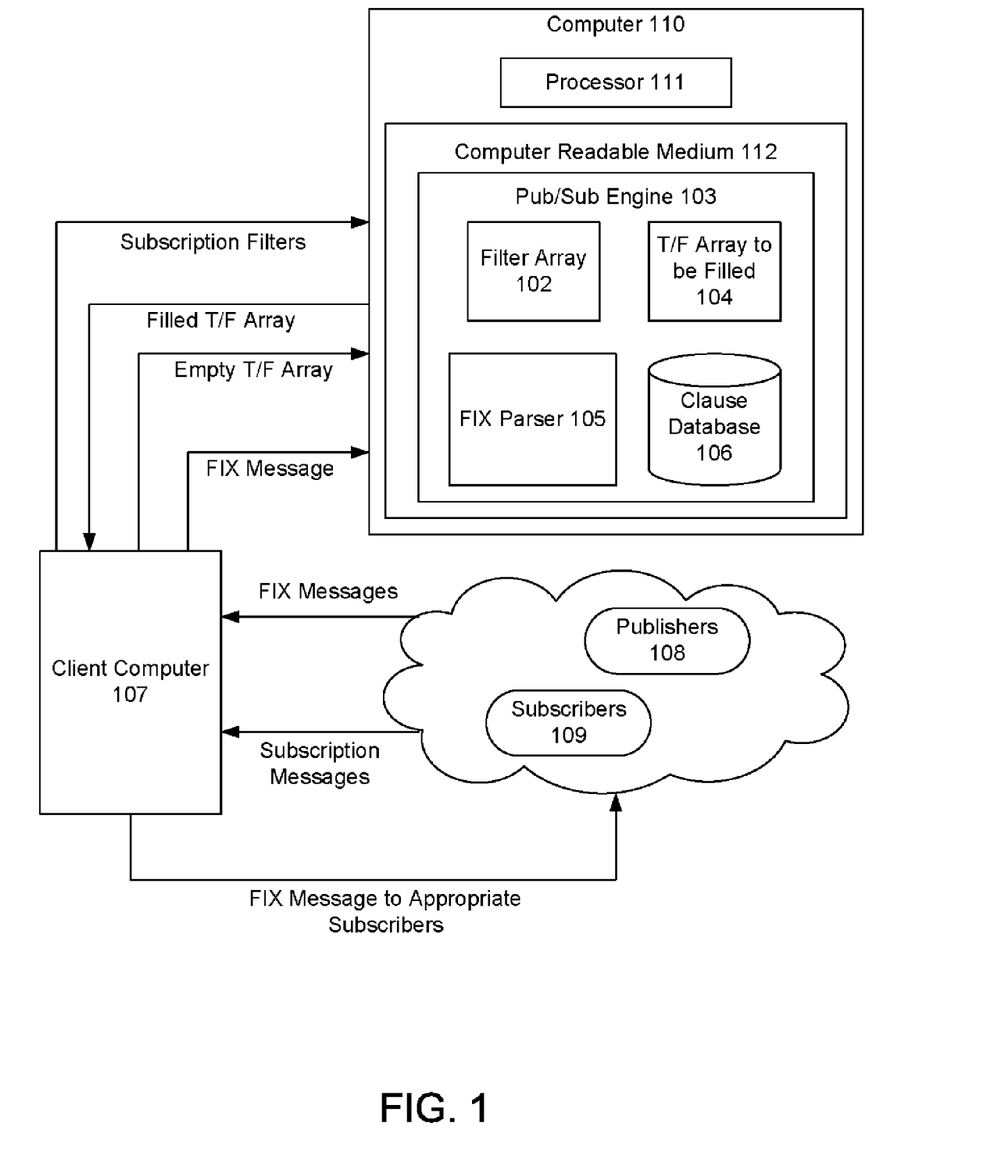
FIG. 1 illustrates a system for automating the content-based processing of FIX messages to facilitate the selective delivery of FIX messages.

FIG. 1 illustrates a system for automating the content-based processing of FIX messages to facilitate the selective delivery of FIX messages. The system includes a computer 110 operatively coupled to a processor 111 and a computer readable medium 112. The computer readable medium 112 stores program code, which when executed by the processor 111, implements a publish/subscribe (pub/sub) engine 103 according to the present invention. The pub/sub engine 103 includes a filter array 102 for storing registered subscription filters, a FIX parser 105 for parsing FIX messages, and a true/false (T/F) array 104 of elements to be filled, where each element corresponds to a subscription filter. For N subscription filters, there are N elements in the T/F array 104. The pub/sub engine 103 is operatively coupled to a clause database 106 for storing clauses in the registered subscription filters.

The pub/sub engine 103 processes FIX messages against the subscription filters in the filter array 102. Pub/sub is an asynchronous messaging paradigm which decouples publishers and subscribers. Senders (publishers) of messages are not programmed to send their messages to specific receivers (subscribers). Rather, published messages are sent to an entity which handles subscriptions. Subscribers express contents of interest to this entity, and only receive messages from the entity that meet the contents of interest, without knowledge of what publishers there are. Although the present invention is described herein in the context of FIX messages, one of ordinary skill in the art would understand that the present invention may also be used for compressed or encoded FIX messages (known in the art as FIX Adapted for STreaming ("FaST") messages) without departing from the spirit and scope of the present invention. Further, the present invention may also be used for a non-FIX-related FaST message with a fixed-position format without departing from the spirit and scope of the present invention.

In the context of the present invention, subscribers 109, via a client computer 107, can specify through subscription messages the content of FIX messages of which they would like to receive. For example, the subscriber 109 can specify a stock name, a stock price, a date or range of dates, a specific event, etc. A subscription filter is then created specifying the content of interest. In this embodiment, the subscription filter is a Boolean (AND, OR, NOT) combination of clauses. A clause is in the format: <field> <operation> <argument>. The <field> is a FIX tag number according to the FIX protocol. A FIX tag number is a numerical representation of a field name. For example, "/55" represents field name "Symbol" for a ticker symbol, and "/44" represents field name "Price" for price per share. In this embodiment, the slash "/" indicates that the number following is a tag number. Other symbols can be used to indicate that a tag number follows. The <operation> is a comparison, such as equals or less than. The <argument> is a numeric or string value with the string value in quotes. Thus, if a subscriber is interested in FIX messages concerning the stock with ticker symbol "IBM" at a price great than $100 per share, the subscriber can register the following filter: /55='IBM' AND /44>100. This filter contains a Boolean combination of two clauses. The first clause, "/55='IBM'", contains the ticker symbol field (55), the operation (=), and the argument ('IBM'). The second clause, "/44>100", contains the price per share field (44), the operation (>), and the argument (100).

The client computer 107 may service a plurality of FIX message publishers 108. These publishers 108 would publish the FIX messages to the client computer 107. The client computer 107 may also service a plurality of subscribers 109, and each subscriber may have a plurality of subscriptions. The client computer 107 provides these subscription filters to the pub/sub engine 103, as well as the FIX messages from the publishers 108. The pub/sub engine 103 then assists the client computer 107 in providing selective delivery of FIX messages by processing the content of the FIX messages according to the subscription filters, as described below. The client computer 107, using the results of the pub/sub engine's 103 processing, re-sends the FIX messages to the appropriate subscriber(s) 109.

Figure 2:
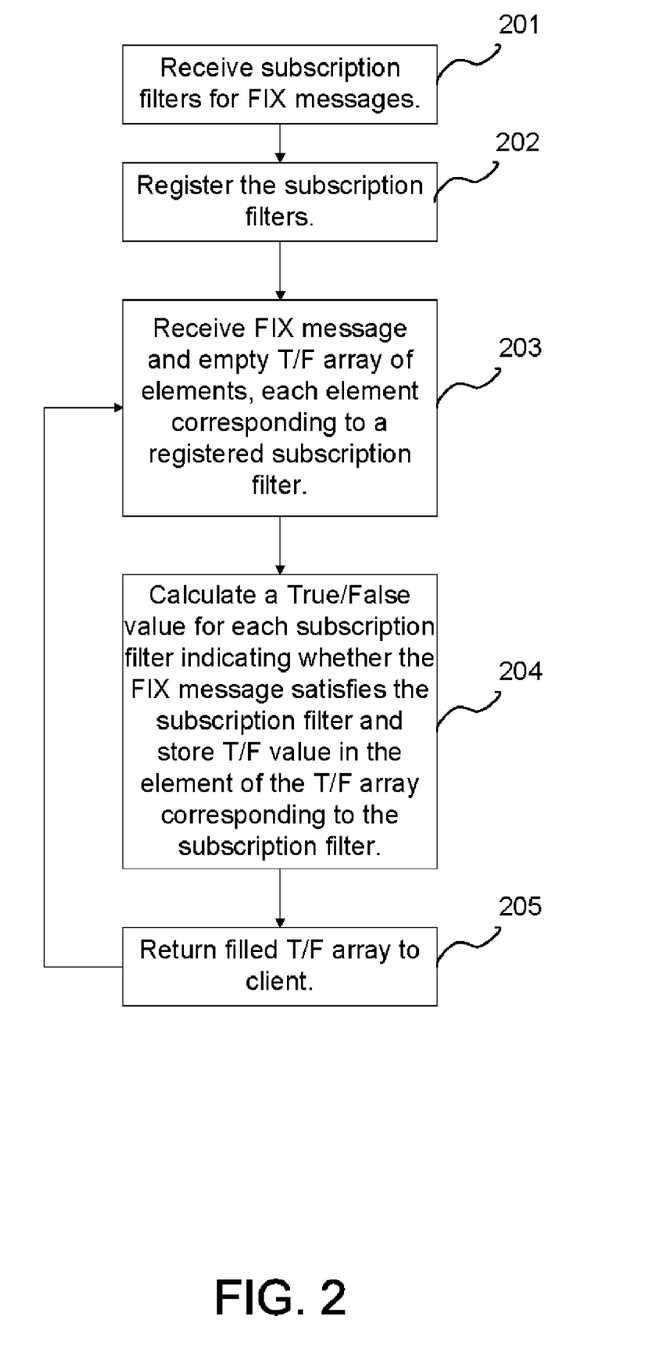
FIG. 2 is a flowchart illustrating the content-based processing of FIX messages by the pub/sub engine.

FIG. 2 is a flowchart illustrating the content-based processing of FIX messages by the pub/sub engine 103. The pub/sub engine 103 receives the subscription filters for FIX messages from the client computer 107 (step 201) and registers the subscription filters (step 202). The pub/sub engine 103 then receives a FIX message and an empty T/F array of elements from the client computer 107 (step 203), where each element corresponds to a registered subscription filter. The T/F array 104 is to be filled by the pub/sub engine 103, as described later below. Alternatively, the T/F array 104 to be filled can be created by the pub/sub engine 103, rather than the array 104 being passed from the client computer 107. After the pub/sub engine 103 receives the FIX message and the empty T/F array, the pub/sub engine 103 calculates a True/False value for each subscription filter indicating whether the FIX message satisfies the subscription filter and stores the T/F value in the element of the T/F array corresponding to the subscription filter (step 204). For example, a True value is calculated if the FIX message satisfies the Boolean combination of each clause of the subscription filter. Otherwise, a False value is calculated. Once the FIX message is processed through all the registered subscription filters, the filled T/F array 104 is returned to the client computer 107 (step 205).

Once the client 107 receives the filled T/F array 104 from the pub/sub engine 103, the client computer 107 uses the array 104 to determine to which subscribers 109 the FIX message is to be sent. For example, for each True valued element in the array 104, the client 107 broadcasts the FIX message to the subscriber who owns the subscription filter corresponding to the element. In this manner, the pub/sub engine 103 facilitates the selective delivery of FIX messages by the client computer 107.

In this embodiment, the subscription filters are sent to the pub/sub engine 103 before the pub/sub engine 103 begins processing any FIX messages. Additional subscription filters can be later sent to the pub/sub engine 103 after processing has begun, however, the processing would not be applied to FIX messages already processed.

Figure 3:
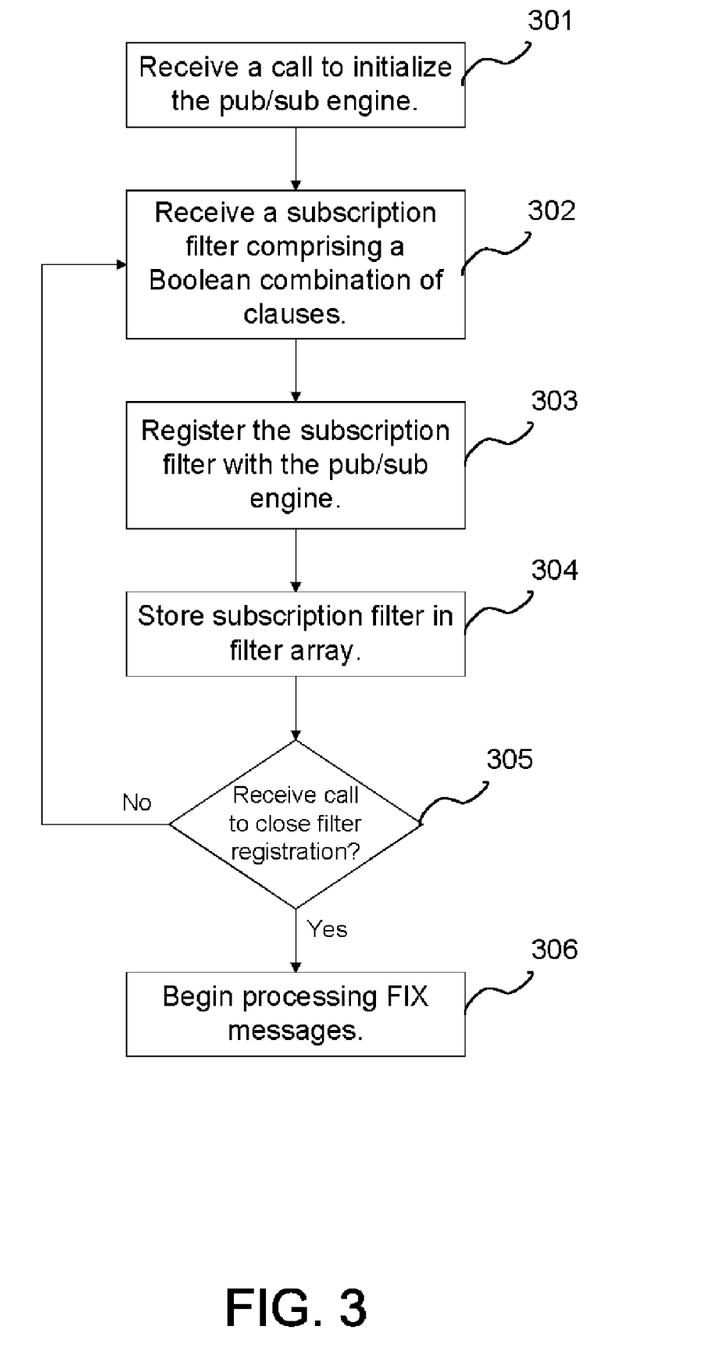
FIG. 3 is a flowchart illustrating in more detail the initialization of the pub/sub engine and the registration of subscription filters.

FIG. 3 is a flowchart illustrating in more detail the initialization of the pub/sub engine 103 and the registration of subscription filters. First, the pub/sub engine 103 receives a call to an initialization function from the client computer 107 to initialize the pub/sub engine 103 (step 301). Upon initialization, the pub/sub engine 103 is ready to receive subscription filters. When the pub/sub engine 103 receives a subscription filter comprising a Boolean combination of clauses (step 302), the pub/sub engine 103 registers the subscription filter (step 303) and stores the subscription filter in the filter array 102 (step 304). If the pub/sub engine 103 receives a call to a close registration function from the client computer 107 to close filter registration (step 305), meaning no more subscription filters will be sent by the client computer 107, the pub/sub engine 103 can begin processing FIX messages according to the registered subscription filters (step 306). Otherwise, the client computer 107 sends the next subscription filter, and steps 302-305 are repeated.

Alternatively, instead of sending one subscription filter at a time for registration, the client computer 107 can send an array of all subscription filters to be registered at one time. The pub/sub engine 103 then would register each subscription filter in this subscription array per steps 303-304.

Figure 4:
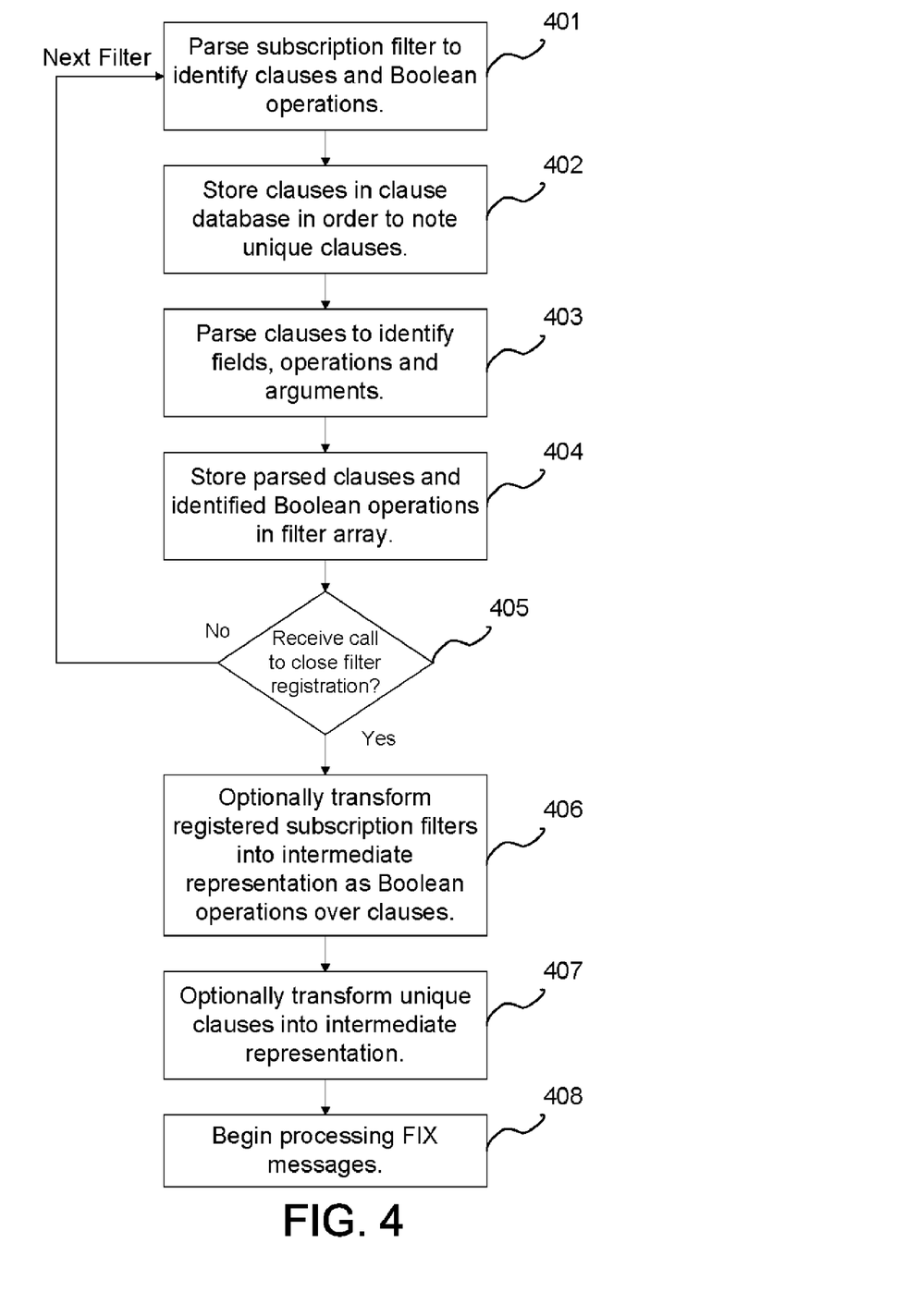
FIG. 4 is a flowchart illustrating in further detail the subscription filter registration by the pub/sub engine.

FIG. 4 is a flowchart illustrating in further detail the subscription filter registration by the pub/sub engine. When the pub/sub engine 103 receives a subscription filter to register (step 302, FIG. 3), the pub/sub engine 103 parses the subscription filter to identify the clauses and Boolean operations in the filter (step 401). These clauses are then stored in the clause database 106 in order to note unique clauses (step 402). For example, if several subscription filters contain the clause "/55='IBM'", then this is a common clause, which can be grouped as one unique clause. During the processing of a FIX message, this unique clause would only be processed once, the result of which is applied to all subscription filters containing this clause. This avoids the processing of this clause multiple times, increasing the efficiency of the process. Once the clauses are identified and stored, the pub/sub engine 103 parses the clauses to identify the fields, operations, and arguments (ex. FIX tags, numbers, strings, etc.) (step 403). The parsed clauses and the identified Boolean operations are then stored in the filter array 102 (step 404). Steps 401-404 are repeated for each subscription filter received, until a call to close filter registration is received (step 404). Once the close filter registration is received, the pub/sub engine 103 can begin processing FIX messages (step 408).

Optionally, all registered subscription filters can be transformed into an intermediate representation, as Boolean operations over clauses (step 406), that are more quickly interpreted by a computer to increase the efficiency of the FIX processing later. The intermediate representation can then be compiled into machine or assembly language to further increase the efficiency of the FIX processing. Optionally, also to increase the efficiency of the FIX processing, all unique clauses stored in the clause database 106 can be identified and transformed into an intermediate representation (step 407). These optimizations are further described in co-pending U.S. patent application entitled, "Systems and Methods for Processing Message Subscriptions Using Pre-Compiled Code-Blocks for Efficient Expression Evaluation", Ser. No. 11/758,204, filed on Jun. 5, 2007. This patent application is hereby incorporate by reference.

Figure 5:
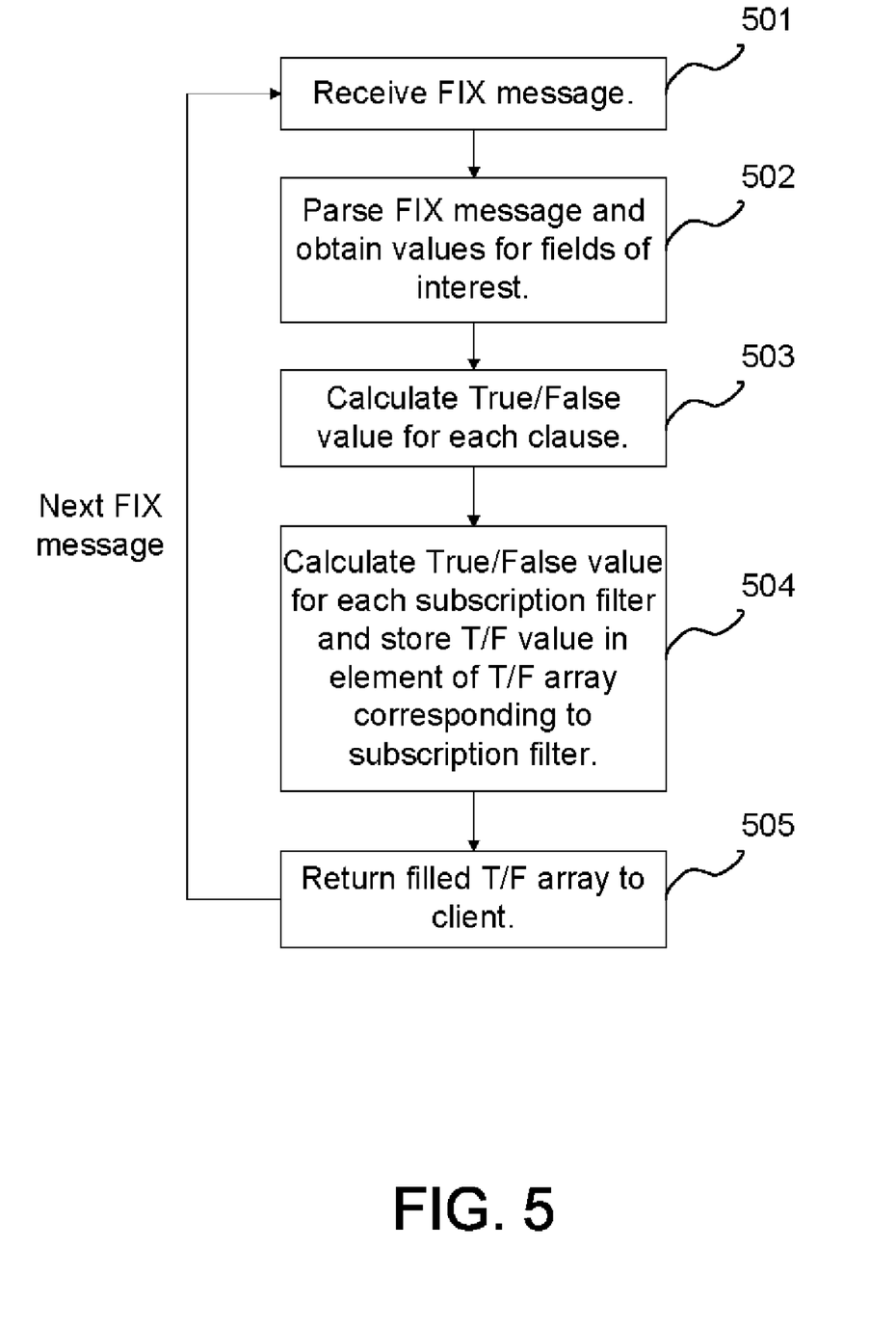
FIG. 5 is a flowchart illustrating in more detail the content-based processing of FIX messages by the pub/sub engine after subscription filters have been registered.

FIG. 5 is a flowchart illustrating in more detail the processing of FIX messages by the pub/sub engine 103 after subscription filters have been registered. The pub/sub engine 103 receives a FIX message (step 501). The pub/sub engine 103 parses the FIX message and obtains the values for the fields of interest (step 502), i.e., the fields indicated in the registered subscription filters stored in the filter array 102. The pub/sub engine 103 next calculates the T/F values for each clause in the registered subscription filters (step 503). Using these T/F values, the pub/sub engine 103 next calculates the T/F value for each subscription filter and stores the T/F value in the element of the T/F array 104 corresponding to the subscription filters (step 504). The filled T/F array 104 is then returned to the client computer 107 (step 505).

For example, consider the following three subscription filters:

/55="IBM" OR /55="INTC" OR /55="MSFT"; (1)

/55="IBM" AND NOT (/44<105); (2)

/55="IBM" AND (/44<100 OR /44>106), (3)

According to the FIX protocol, 55 is the tag for the ticker symbol field, and 44 is the tag for the price per share field.

Referring to FIG. 2, the pub/sub engine 103 receives the subscription filters (1)-(3) (step 201), and registers the subscription filters (step 202). The pub/sub engine 103 receives an empty T/F array 104 of elements passed to it by the client computer 107, where each element in the T/F array 104 corresponds to a subscription filter (step 203). In this example, since there are three subscription filters, the T/F array 104 would have three elements.

Referring to FIG. 4, in registering the subscription filters (1)-(3), the pub/sub engine 103 first parses the subscription filters to identify clauses and Boolean operations (step 401), as set forth below.

Filter (1) clauses: /55="IBM"; /55="INTC"; /55="MSFT". Filter (1) Boolean operations: OR; OR; OR.

Filter (2) clauses: /55="IBM"; /44<105. Filter (2) Boolean operations: AND; NOT.

Filter (3) clauses: /55="IBM"; /44<100; /44>106. Filter (3) Boolean operations: AND; OR.

The pub/sub engine 103 stores the clauses in the clause database 106 (step 402). In this example, there are six unique clauses: /55='IBM'; /55='INTC'; /55='MSFT'; /44<105; /44<100; and /44>106. The unique clauses are then parsed to identify the fields, operations, and arguments (step 403), as set forth below.

Unique clause I (/55="IBM"): field 55; operation=; argument 'IBM' (string).
Unique clause II (/55="INTC"): field 55; operation=; argument 'INTC' (string).
Unique clause III (/55="MSFT"): field 55; operation=; argument 'MSFT' (string).
Unique clause IV (/44<105): field 44; operation<; argument '105' (number).
Unique clause V (/44<100): field 44; operation<; argument '100' (number).
Unique clause VI (/44>106): field 44; operation>; argument '106' (number).

These parsed clauses and identified Boolean operations are stored in the filter array 102 (step 404).

Assume that the pub/sub engine 103 receives the following example FIX messages (step 204) (shown partially below, using "|" as a separator):

... 55=IBM|44=105.85|53=200| (A)

... 55=INTC|44=15.5|53=300| (B)

... 55=MSFT|44=20.42|53=250| (C)

... 55=IBM|44=106.15|53=100| (D)

According to the FIX protocol, 53 is the tag for the number of shares field.

For FIX message (A), the pub/sub engine 103 calculates a T/F value for each filter (1) (3) indicating whether message (A) satisfies the subscription filters (step 204). For each subscription filter, the T/F value is then stored in the element of the T/F array 104 corresponding to the subscription filter (step 205). For message (A), the filled T/F array 104 would contain the following values: T, T, F (for filters (1), (2), and (3)) respectively. This filled T/F array 104 is then returned to the client computer 107 (step 206).

Referring to FIG. 5, the pub/sub engine 103 receives the FIX message (step 501), parses the FIX message (step 502), and obtains the values for the fields of interest in the clauses of the registered subscription filters (1)-(3) (step 503), as set forth below.

Filter (1) fields of interest: 55 (ticker symbol). Values: IBM, INTC, MSFT.

Filter (2) fields of interest: 55 (ticker symbol); 44 (price per share). Values: IBM, and 105.85.

Filter (3) fields of interest: 55 (ticker symbol); 44 (price per share). Values: IBM, 105.85.

The pub/sub engine 103 next calculates the T/F value for each clause (step 504), as set forth below. In this embodiment, each unique clause in the registered subscription filters (1) (3), transformed in steps 406-407, is evaluated only once, regardless of how many times a clause is used in the filters.

Filter (1) clauses: /55="IBM"; /55="TNTC"; and /55="MSFT". T/F values for clauses: T, F, F.

Filter (2) clauses: /55="IBM"; /44<105. T/F values for the clauses: T, F.

Filter (3) clauses: /55="IBM"; /44<100; /44>106. T/F values for clauses: T, F, F.

The pub/sub engine 103 next calculates the T/F value for each subscription filter (step 505), as set forth below.

Filter (1): T OR F OR F=>T
Filter (2): T AND NOT F=>T
Filter (3): T AND (F OR F)=>F The T/F values for each filter is then stored in the T/F array 104 (step 506). In this example, T, T, F are stored in the T/F array 104. This filled T/F array 104 is returned to the client computer 107 (step 507).

Steps 203 through 206, and steps 501 through 507, are repeated for FIX messages (B), (C), and (D), resulting in the following filled T/F arrays 104:

For FIX message (B): T, F, F
For FIX message (C): T, F, F
For FIX message (D): T, T, T A method for automated content-based processing of FIX messages to facilitate the selective delivery of FIX messages has been disclosed. Although the invention has been described in accordance with the embodiments shown, one of ordinary skill in the art will readily recognize that there could be variations to the embodiments and those variations would be within the spirit and scope of the invention. Accordingly, many modifications may be made by one of ordinary skill in the art without departing from the spirit and scope of the appended claims.

What is claimed is:

1. A method for processing Financial Information eXchange (FIX) messages implemented by a computer comprising a processor, comprising:
    (a) receiving by the processor a FIX message;
    (b) for each of a plurality of subscription filters received from a client computer, calculating by the processor a True/False value indicating whether the FIX message satisfies the subscription filter, wherein each subscription filter indicates FIX message content of interest, wherein the received plurality of subscription filters each comprise a Boolean combination of clauses, wherein the calculating (b) comprises:
        (b1) obtaining values for fields of interest in the plurality of subscription filters;
        (b2) for each clause in each of the plurality of subscription filters, calculating a True/False value for the clause, wherein each clause in each of the plurality of subscription filters is stored in a clause database, wherein for each clause in the clause database that is unique, the calculating (b2) is performed once; and
        (b3) for each of the plurality of subscription filters, calculating a True/False value for the subscription filter using the True/False values calculated in (b2);
    (c) storing the True/False values for the plurality of subscription filters in a True/False array; and
    (d) returning the True/False array to the client computer.

2. The method of claim 1, wherein prior to the receiving (a), the method comprises:
    (a1) receiving the plurality of subscription filters from the client computer; and
    (a2) registering the plurality of subscription filters.

3. The method of claim 2, further comprising:
    (a3) receiving the FIX message and an empty True/False array of elements from the client computer, wherein each element corresponds to one of the plurality of registered subscription filters.

4. The method of claim 2, wherein the received plurality of subscription filters each comprise a Boolean combination of clauses, wherein for each subscription filter, the registering (a2) comprises:
    (a2i) parsing the subscription filter to identify clauses and Boolean operations;
    (a2ii) parsing each of the identified clauses to identify field, operations, and argument; and
    (a2iii) storing the parsed clauses and identified Boolean operations in a filter array.

5. The method of claim 4, wherein the registering (a2) further comprises:
    (a2iv) transforming the registered subscription filters to an intermediate representation as Boolean operations over clauses.

6. The method of claim 5, wherein the registering (a2) further comprises:
    (a2v) compiling the intermediate representation into machine or assembly language.

7. The method of claim 4, wherein each clause in each of the plurality of subscription filters is stored in a clause database, wherein the registering (a2) further comprises:
    (a2iv) transforming unique clauses in the clause database to an intermediate representation.

8. The method of claim 1, wherein the FIX message comprises a FIX Adapted for STreaming (FaST) message.

9. A computer program product comprising a non-transitory computer useable medium having a computer readable program for processing Financial Information eXchange (FIX) messages, wherein the computer readable program when executed on a computer causes the computer to:
    (a) receive a FIX message;
    (b) for each of a plurality of subscription filters received from a client computer, calculate a True/False value indicating whether the FIX message satisfies the subscription filter, wherein each subscription filter indicates FIX message content of interest, wherein the received plurality of subscription filters each comprise a Boolean combination of clauses, wherein the calculate (b) comprises:
        (b1) obtain values for fields of interest in the plurality of subscription filters;
        (b2) for each clause in each of the plurality of subscription filters, calculate a True/False value for the clause, wherein each clause in each of the plurality of subscription filters is stored in a clause database, wherein for each clause in the clause database that is unique, the calculate (b2) is performed once; and (b3) for each of the plurality of subscription filters, calculate a True/False value for the subscription filter using the True/False values calculated in (b2);

(c) store the True/False values for the plurality of subscription filters in a True/False array; and (d) return the True/False array to the client computer.

10. The computer program product of claim 9, wherein prior to the receive (a), the computer readable program when executed on the computer causes the computer to:

(a1) receive the plurality of subscription filters from the client computer; and (a2) register the plurality of subscription filters.

11. The computer program product of claim 10, wherein the computer readable program when executed on the computer causes the computer to further:

(a3) receive the FIX message and an empty True/False array of elements from the client computer, wherein each element corresponds to one of the plurality of registered subscription filters.

12. The computer program product of claim 10, wherein the received plurality of subscription filters each comprise a Boolean combination of clauses, wherein for each subscription filter, the register (a2) comprises:

(a2i) parse the subscription filter to identify clauses and Boolean operations;

(a2ii) parse each of the identified clauses to identify field, operations, and argument; and (a2iii) store the parsed clauses and identified Boolean operations in a filter array.

13. The computer program product of claim 12, wherein the register (a2) further comprises:

(a2iv) transform the registered subscription filters to an intermediate representation as Boolean operations over clauses.

14. The computer program product of claim 13, wherein the register (a2) further comprises:

(a2v) compile the intermediate representation into machine or assembly language.

15. The computer program product of claim 12, wherein each clause in each of the plurality of subscription filters is stored in a clause database, wherein the register (a2) further comprises:

(a2iv) transform unique clauses in the clause database to an intermediate representation.

16. The computer program product of claim 9, wherein the FIX message comprises a FIX Adapted for STreaming (FaST) message.

17. A system, comprising:
a client computer; and
a computer operatively coupled to the client computer for processing Financial Information eXchange (FIX) message, wherein the computer comprises a computer useable medium having a computer readable program, wherein the computer readable program when executed on a computer causes the computer to:

(a) receive a FIX message;

(b) for each of a plurality of subscription filters received from the client computer, calculate a True/False value indicating whether the FIX message satisfies the subscription filter, wherein each subscription filter indicates FIX message content of interest, wherein the received plurality of subscription filters each comprise a Boolean combination of clauses, wherein the calculate (b) comprises:

(b1) obtain values for fields of interest in the plurality of subscription filters;

(b2) for each clause in each of the plurality of subscription filters, calculate a True/False value for the clause, wherein each clause in each of the plurality of subscription filters is stored in a clause database, wherein for each unique clause in the clause database, the calculate (b2) is performed once; and (b3) for each of the plurality of subscription filters, calculate a True/False value for the subscription filter using the True/False values calculated in (b2);

(c) store the True/False values for the plurality of subscription filters in a True/False array; and (d) return the True/False array to the client computer.

18. The system of claim 17, wherein prior to the receive (a), the computer readable program when executed on the computer causes the computer to:

(a1) receive the plurality of subscription filters from the client computer; and (a2) register the plurality of subscription filters.

19. The system of claim 18, wherein the computer readable program when executed on the computer causes the computer to further:

(a3) receive the FIX message and an empty True/False array of elements from the client computer, wherein each element corresponds to one of the plurality of registered subscription filters.

20. The system of claim 18, wherein the received plurality of subscription filters each comprise a Boolean combination of clauses, wherein for each subscription filter, the register (a2) comprises:

(a2i) parse the subscription filter to identify clauses and Boolean operations;

(a2ii) parse each of the identified clauses to identify field, operations, and argument; and (a2iii) store the parsed clauses and identified Boolean operations in a filter array.

21. The system of claim 20, wherein the register (a2) further comprises:

(a2iv) transform the registered subscription filters to an intermediate representation as Boolean operations over clauses.

22. The system of claim 21, wherein the register (a2) further comprises:

(a2v) compile the intermediate representation into machine or assembly language.

23. The system of claim 20, wherein each clause in each of the plurality of subscription filters is stored in a clause database, wherein the register (a2) further comprises:

(a2iv) transform unique clauses in the clause database to an intermediate representation.

24. The system of claim 17, wherein the FIX message comprises a FIX Adapted for STreaming (FaST) message.

* * * * *